United States Patent
Steigerwald et al.

(10) Patent No.: US 6,735,094 B2
(45) Date of Patent: May 11, 2004

(54) LOW-NOISE MULTI-OUTPUT POWER SUPPLY CIRCUIT FEATURING EFFICIENT LINEAR REGULATORS AND METHOD OF DESIGN

(75) Inventors: Robert Louis Steigerwald, Burnt Hills, NY (US); Chester Frank Saj, Amsterdam, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/219,121

(22) Filed: Aug. 15, 2002

(65) Prior Publication Data

US 2004/0032239 A1 Feb. 19, 2004

(51) Int. Cl.$^7$ .............................................. H02M 3/335
(52) U.S. Cl. ......................... 363/17; 363/98; 363/56.03
(58) Field of Search .............................. 363/17, 56.02, 363/56.03, 98

(56) References Cited

U.S. PATENT DOCUMENTS

| | | | | |
|---|---|---|---|---|
| 4,315,304 A | * | 2/1982 | Marez et al. | 363/49 |
| 4,447,841 A | * | 5/1984 | Kent | 361/18 |
| 4,517,472 A | * | 5/1985 | Ruitberg et al. | 307/82 |
| 4,858,052 A | * | 8/1989 | McDonnal | 361/18 |
| 4,967,335 A | * | 10/1990 | Konopka | 363/82 |

\* cited by examiner

*Primary Examiner*—Bao Q. Vu
(74) *Attorney, Agent, or Firm*—Scully, Scott, Murphy & Presser

(57) ABSTRACT

A low noise, multiple output power supply circuit featuring a plurality of efficient linear regulators comprises a transformer having a primary circuit with a primary transformer input winding and a plurality of secondary circuits. Each secondary circuit has a secondary transformer output winding having the same number of turns of secondary windings. A saturable reactor core is placed in series with at least one selected output winding of at least one selected secondary circuit to subtract a small amount of average voltage, volt-seconds, from the output voltage of the selected output winding to allow different rectified DC voltages to be obtained from different output windings which have the same number of turns.

22 Claims, 1 Drawing Sheet

LOW-NOISE MULTI-OUTPUT POWER SUPPLY CIRCUIT FEATURING EFFICIENT LINEAR REGULATORS AND METHOD OF DESIGN

BACKGROUND OF THE INVENTION

The present invention relates generally to a low-noise multi-output power supply circuit and a method of designing a low-noise multi-output power supply circuit featuring efficient linear regulators. The power supply circuit and method provides a small saturable reactor core placed in series with selected AC output windings of the multi-output power supply to subtract a small amount of average voltage (volt-seconds) from each of the selected windings. This allows different rectified DC voltages to be obtained from different secondary windings even though the different secondary windings have the same number of turns (a single turn in most cases).

To achieve high efficiency in a multi-output, low-noise power supply that employs a multiple number of linear regulators, it is desirable that the voltage dropped across each linear regulating element be as small as possible. Due to the high frequency and low output voltages required, only a single secondary turn (or in some cases 2 turns) is normally needed. This results in high "granularity" so that slightly different output voltages cannot be obtained. For example, if the number of secondary turns is increased from 1 to 2, the output voltage doubles, often requiring a very large increase in the voltage drop across the linear regulator and hence a very large increase in the linear regulator power dissipation.

On the other hand, there needs to be at least a few hundred millivolts voltage drop across each linear regulator so that the regulator can do its job. If one power supply secondary output voltage is regulated in a conventional feedback fashion (without a linear regulator), then the other output voltages (which may be required to be regulated to the same level) will not have a sufficient "overhead" voltage to operate properly. It would be desirable to obtain slightly different transformer secondary output voltages without changing the number of transformer turns. This would allow all of the linear regulators to operate with a minimum overhead voltage and therefore operate with high efficiency.

Multiple output voltage, low noise power supplies have typically employed individual primary circuits and transformers, one for each different output voltage power supply. Alternatively, one transformer with multiple secondary windings has been used and the granularity has been accepted, along with the high overhead voltage and high inefficiencies associated with this approach. Both of these approaches lead to increased complexity and costs. Tight magnetic coupling between the transformer secondaries along with coupling of the output filter inductor windings typically cannot be achieved to the degree necessary to meet the voltage regulation requirements for multiple high power outputs.

SUMMARY OF THE INVENTION

A low-noise multi-output power supply circuit and method of design thereof features efficient linear regulators, and provides a small saturable reactor core placed in series with selected AC output windings of the multi-output power supply to subtract a small amount of average voltage (volt-seconds) from each of the selected windings. This allows different rectified DC voltages to be obtained from different secondary windings even though the different secondary windings have the same number of turns (a single turn in most cases). This overcomes the "granularity" problem of having a low number of turns on the secondary windings (e.g., going from 1 to 2 turns doubles the output voltage), and reduces the voltage drop across the series regulating element of each linear regulator used in the low-noise, low-voltage outputs and thereby increases their efficiency. Different cross-sectional area reactor cores subtract different amounts of voltage since they introduce different amounts of delay in the reactor core saturation time and hence a different amount of voltage "holdoff" to the output circuits. Using this technique, a single primary power circuit can be used to supply multiple linear regulators with minimum overhead voltages which are not constrained by the granularity imposed by the low number of turns in the secondaries, to provide an inexpensive, efficient, multiple output, low noise, and relatively high voltage power supply.

A low-noise multi-output power supply circuit and method of design thereof features efficient linear regulators and uses a single primary circuit that provides a minimum overhead voltage to all linear regulators (resulting in high efficiency). Saturable reactors, which do not require another separate winding for control, reduce the average voltage supplied to the regulators, each of which is set using an appropriate cross-sectional core area, providing an effective fractional transformer turn variation using a saturable core, and resulting in a reduction in the granularity limitations normally encountered in multiple secondary turns with a low number of secondary turns.

BRIEF DESCRIPTION OF THE DRAWINGS

The foregoing objects and advantages of the present invention for a low-noise multi-output power supply circuit and method of design thereof featuring efficient linear regulators may be more readily understood by one skilled in the art with reference being had to the following detailed description of several embodiments thereof wherein the FIGURE shows a first exemplary design of one embodiment of a power supply circuit wherein a primary side phase shifted full bridge circuit provides the pulse width modulation required to regulate the output voltages on the secondary side of a transformer of the power supply.

DETAILED DESCRIPTION OF THE DRAWINGS

Figure 1:
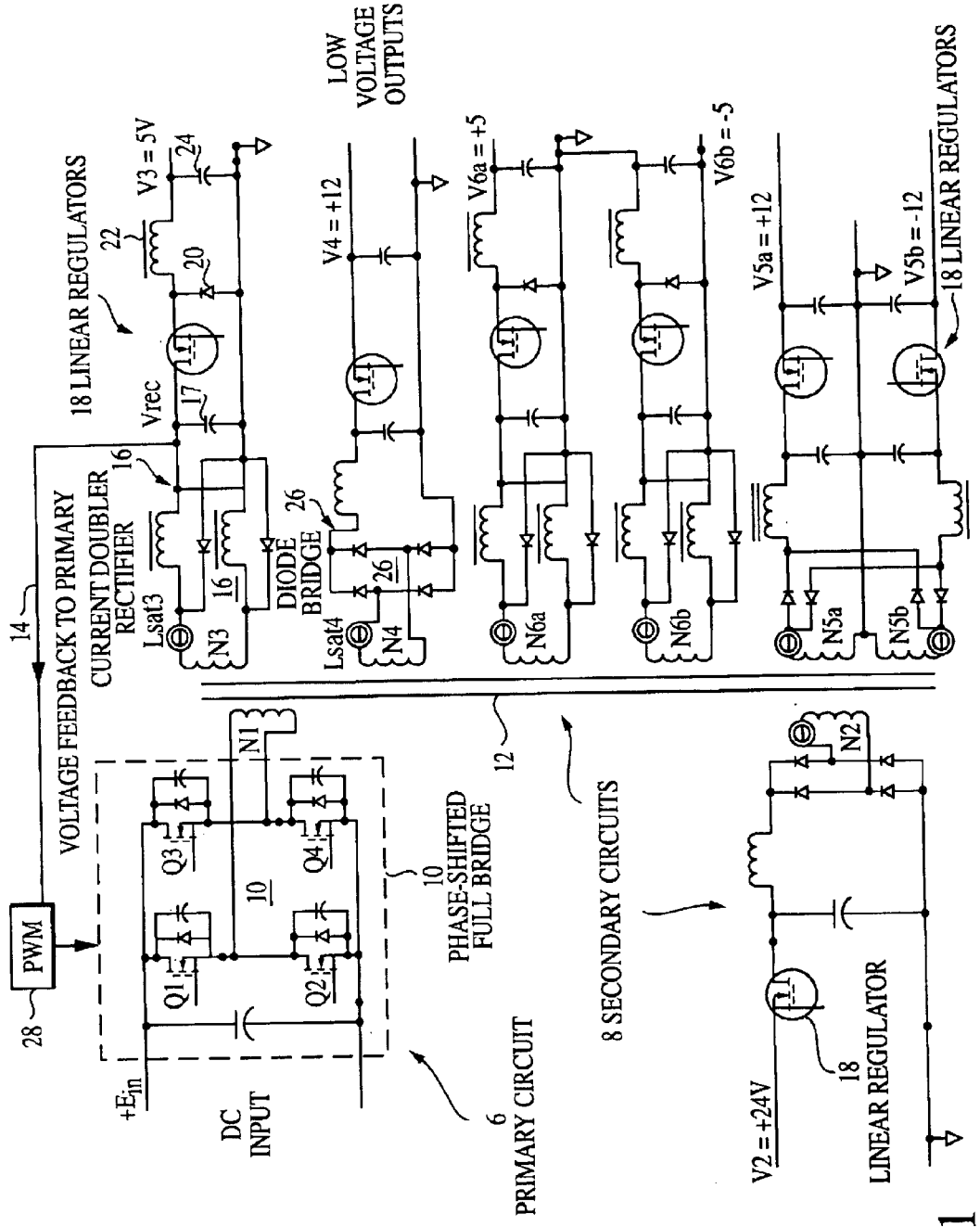

The FIGURE shows a first exemplary design of one embodiment of the present invention having a primary circuit 6 connected to a plurality of secondary circuits 8 through a transformer 12. A primary side phase shifted full bridge circuit 10 provides the pulse width modulation required to regulate one of the output voltage V3 on the secondary side of the transformer 12 of the power supply. In the case illustrated, the rectified output voltage Vrec of secondary winding N3 is regulated by a voltage feedback signal 14 to the primary side control circuit. The primary side phase shifted full bridge 10 is described in U.S. Pat. No. 4,864,479 by Steigerwald et al., but any other well known PWM primary circuits could also be used.

For a low voltage output converter, the winding N3 is typically 1 turn. In the FIGURE, the output of N3 feeds a current doubler rectifier circuit 16. As is well known, this type of rectifier halves the average rectified winding voltage and doubles the average rectified current. The rectified voltage Vrec, taken across a capacitor 17, may be fed directly to the load, or, as shown in the FIGURE be further regulated by a linear regulator 18 which passes through an inductor 22 to a capacitor 24 to produce a well regulated final output voltage V3 across the capacitor 24. A rectifying diode 20 provides a path for the inductor current when the power supply is shut down or if the linear regulator 18 is turned off.

The secondary circuits for secondary windings N2, N5a and N5b are similar in design and operation to the secondary circuit for secondary winding N3 as explained above.

It is desired that all of the other output voltages on all of the other secondary windings N2, N4, N5a, N5b, N6a and N6b track closely the voltage on the secondary winding N3. But in practice the magnetic coupling is far from perfect, and all of the other linear outputs can be regulated with linear regulators as shown.

Each linear regulator needs an input voltage slightly higher than the desired output voltage, but not too high if the regulators are to operate efficiently. A high current on one winding may drag down an output voltage of another winding.

As an example, assume that the transformer is wound such that 12 volts per turn is produced on each of the secondary windings. If Vrec is slightly higher than the desired output V3 (e.g. Vrec=5.5 Vdc>5 Vdc), and if it is desired to have V4 equal +12 Vdc, then the input to the linear regulator of V4 needs to be above +12 volts (e.g., 12.5). But if N4 is one turn, it only produces around 11 volts. It is noted that N4 feeds a conventional diode bridge 26 so that the rectified output voltage is equal to the rectified output voltage of winding N4.

In the prior art, to get a voltage higher than 12 volts, another turn would normally be added. This will give a voltage into the linear regulator of 22 volts. Then, a high loss will result due to the high overhead voltage, Voh, across the regulator (22−12=10 Vdc). This will result in high losses for the linear regulator since the loss is: Ploss=Voh*Iload=(Vin−Vload)*Iload where, Vin=the input voltage to the linear regulator, Vload=the output load voltage, ILoad=load current.

It is desired to raise the voltage Vrec4 to about 12.5 from 11 volts which will greatly increase the efficiency of the linear regulator. The voltage to the +12 volt regulator can be raised a small amount without changing the turns ratio as follows. A small saturable reactor core Lsat3 is placed in series with the N3 winding as shown. The core acts as a "lossless" switch which delays application of a voltage to the output Vrec for a small fraction of the switching cycle (this reduces the average output voltage). Therefore, in order to raise the output voltage to the desired regulated value, the pulse width of the primary side PWM modulator 28 is increased in response to the feedback signal 14 to increase the equivalent "on time".

This adjustment of the N3 winding circuit has the effect of increasing the voltage pulse width through winding N4, which in turn raises the average rectified voltage Vrec4 to above 12 volts, exactly the action desired. Hence, reducing the output of output winding N3 causes the pulse width to increase and increase the output voltage of output winding N4.

Output winding N4 may not necessarily need a series saturable inductor Lsat4, but one with appropriate cross-sectional area can be used to fine tune the regulated V4 output voltage. By using reactor inductors with variable cross-sections in all of the winding secondaries, all of the outputs can be fined tuned to produce an output voltage with enough overhead (but not too much) to the inputs to all of the linear regulators 18 so that they can run efficiently. It is noted that some windings may not need a saturable reactor inductor, while other windings may use saturable reactor inductors of varying cross-sectional areas (to produce various voltage hold off times).

The secondary circuits for secondary windings N6a and N6b are similar in design and operation to the secondary circuit for secondary winding N4 as explained above.

An important feature of the present invention is that a single primary side circuit 10, 28, N1 supplies multiple secondary linear regulators 18 with minimum overhead voltages leading to high efficiency. The approach overcomes "granularity" problems normally associated with multiple output low voltage supplies. The low-noise multi-output power provides the equivalent of a fractional turn for the secondary circuit. By using saturable reactor inductors Lsats with variable cross-sectional areas in some or all of the winding secondaries, the outputs can be fined tuned to provide an output voltage with enough overhead (but not to much) to the inputs of all of the linear regulators 18 so that they run efficiently. Some windings may need not saturable inductors, while others may use saturable inductors of varying cross-sectional areas (to provide various voltage hold off times).

The present invention provides a single primary power circuit 10, 28, N1 to supply multiple linear regulators 18 with minimum overhead voltages which are not constrained by the granularity imposed by the low number of turns secondaries, and provides an inexpensive, low noise efficient solution capable of providing a relatively low voltage power supply.

The embodiment of the FIGURE is designed with one secondary turn in each of the secondary circuits, and illustrates a variety of diode bridge arrangements to produce a full rectified voltage or a half rectified voltage (while doubling the current), and then places saturable reactor cores in series with selected output windings to subtract a small amount of average voltage, volt-seconds, from the output voltages of the selected output windings, to allow different rectified DC voltages to be obtained from different output windings which have the same number of turns.

The technical approach of placing saturable reactor cores in series with selected output windings could also be applied to circuits wherein different secondary circuits having different numbers of turns of secondary windings, such as some secondary windings having a single turn and others having two turns. Additional flexibility can be provided by using a variety of diode bridge arrangements.

While several embodiments and variations of the present invention for a low-noise multi-output power supply circuit and method of design thereof featuring efficient linear regulators are described in detail herein, it should be apparent that the disclosure and teachings of the present invention will suggest many alternative designs to those skilled in the art.

What is claimed is:

1. A low noise, multiple output power supply circuit featuring a plurality of efficient linear regulators comprising:

a transformer having a primary circuit with a primary transformer input winding, and a plurality of secondary circuits, wherein each secondary circuit has a secondary transformer output winding having at least one turn of secondary windings;

wherein a saturable reactor core is placed in series with at least one selected output winding of at least one selected secondary circuit to subtract a small amount of average voltage, volt-seconds, from the output voltage of the selected output winding, to allow different rectified DC voltages to be obtained from different output windings.

2. The power supply circuit of claim 1, wherein each secondary circuit has a secondary transformer output winding having the same number of turns of secondary windings.

3. The power supply circuit of claim 2, wherein each output winding has a single turn.

4. The power supply circuit of claim 1, wherein different output windings have different cross-sectional area saturable reactor cores to subtract different amounts of voltage by introducing different amounts of delay in the saturation time of the saturable reactor cores.

5. The power supply circuit of claim 1, wherein the primary circuit includes a phase shifted full bridge circuit which provides pulse width modulation to regulate the output voltage of a secondary feedback circuit, wherein an output voltage of the secondary feedback circuit forms a voltage feedback signal to control operation of the primary circuit.

6. The power supply circuit of claim 1, wherein at least one secondary circuit includes a current doubler rectifier circuit which halves the average rectified output winding voltage and doubles the average rectified output current.

7. The power supply circuit of claim 1, wherein each secondary circuit includes a diode rectifier circuit to produce a rectified voltage which charges a capacitor to produce a rectified secondary output voltage.

8. The power supply circuit of claim 1, wherein each secondary circuit includes a linear regulator which further regulates each rectified secondary output voltage.

9. The power supply circuit of claim 1, wherein at least one secondary circuit includes a conventional diode bridge which produces a rectified output voltage equal to the rectified output voltage of the secondary output winding.

10. The power supply circuit of claim 1, wherein the primary circuit includes a pulse width modulator control circuit to control the voltage produced by the secondary circuits, wherein an increase in the pulse width of the signal provided by the pulse width modulator increases the pulse width on the secondary windings to increase the rectified secondary output voltages, and vice versa.

11. A method of designing a low noise, multiple output power supply circuit featuring a plurality of efficient linear regulators and a transformer having a primary circuit with a primary transformer input winding, and a plurality of secondary circuits, the method comprising providing each secondary circuit with a secondary transformer output winding having at least one turn of secondary windings, and developing different rectified DC voltages from different output windings by placing a saturable reactor core in series with at least one selected output winding of at least one selected secondary circuit to subtract a small amount of average voltage, volt-seconds, from the output voltage of the selected output winding.

12. The method of claim 11, including providing each secondary circuit with a secondary transformer output winding having the same number of turns of secondary windings.

13. The method of claim 12, including providing each output winding with a single turn.

14. The method of claim 11, including providing different output windings with different cross-sectional area saturable reactor cores to subtract different amounts of voltage by introducing different amounts of delay in the saturation time of the saturable reactor cores.

15. The method of claim 11, including providing the primary circuit with a phase shifted full bridge circuit to provide pulse width modulation to regulate the output voltage of a secondary feedback circuit, and forming a voltage feedback signal from an output voltage of the secondary feedback circuit to control operation of the primary circuit.

16. The method of claim 11, including providing at least one secondary circuit with a current doubler rectifier circuit which halves the average rectified output winding voltage and doubles the average rectified output current.

17. The method of claim 11, including providing each secondary circuit with a diode rectifier circuit to produce a rectified voltage which charges a capacitor to produce a rectified secondary output voltage.

18. The method of claim 11, including providing each secondary circuit with a linear regulator which further regulates each rectified secondary output voltage.

19. The method of claim 11, including providing at least one secondary circuit with a conventional diode bridge which produces a rectified output voltage equal to the rectified output voltage of the secondary output winding.

20. The method of claim 11, including providing the primary circuit with a pulse width modulator control circuit to control the voltage produced by the secondary circuits, wherein an increase in the pulse width of the signal provided by the pulse width modulator increases the pulse width on the secondary windings to increase the rectified secondary output voltages, and vice versa.

21. A low noise, multiple output power supply circuit featuring a plurality of efficient linear regulators comprising:

a transformer having a primary circuit with a primary transformer input winding, and a plurality of secondary circuits, wherein each secondary circuit has a secondary transformer output winding having the same number of turns of secondary windings;

wherein a saturable reactor core is placed in series with at least one selected output winding of at least one selected secondary circuit to subtract a small amount of average voltage, volt-seconds, from the output voltage of the selected output winding, to allow different rectified DC voltages to be obtained from different output windings, and wherein different output windings have different cross-sectional area saturable reactor cores to subtract different amounts of voltage by introducing different amounts of delay in the saturation time of the saturable reactor cores.

22. A method of designing a low noise, multiple output power supply circuit featuring a plurality of efficient linear regulators and a transformer having a primary circuit with a primary transformer input winding, and a plurality of secondary circuits, the method comprising providing each secondary circuit with a secondary transformer output winding having the same number of turns of secondary windings, and developing different rectified DC voltages from different output windings by placing a saturable reactor core in series with at least one selected output winding of at least one selected secondary circuit to subtract a small amount of average voltage, volt-seconds, from the output voltage of the selected output winding, and including providing different cross-sectional area saturable reactor cores to subtract different amounts of voltage by introducing different amounts of delay in the saturation time of the saturable reactor cores.

* * * * *